United States Patent
Jaaskelainen, Jr. et al.

(10) Patent No.: US 6,630,217 B1
(45) Date of Patent: Oct. 7, 2003

(54) ASSEMBLY AND METHOD TO IMPROVE TARPAULIN FUNCTION AS A PROTECTIVE COVER

(76) Inventors: William Jaaskelainen, Jr., 11712 Brookwood Rd., Austin, TX (US) 78750; Jeffrey Carl Schoenherr, 31812 Pam Ct., Fraser, MI (US) 48026; Ronald James Urbin, 28851 Iron Wood Dr., Warren, MI (US) 48093

( * ) Notice: Subject to any disclaimer, the term of this patent is extended or adjusted under 35 U.S.C. 154(b) by 0 days.

(21) Appl. No.: 09/550,988

(22) Filed: Apr. 17, 2000

(51) Int. Cl.[7] .................. B29D 22/00; B29D 23/00; B32B 1/08
(52) U.S. Cl. .................. 428/36.9; 428/35.7; 428/36.5; 428/36.91; 180/308; 24/270
(58) Field of Search ............... 428/35.7, 36.5, 428/36.91, 36.9; 180/308; 24/270

(56) References Cited

U.S. PATENT DOCUMENTS

| | | | | |
|---|---|---|---|---|
| 207,470 A | * | 8/1878 | Wolf | 24/270 |
| 2,277,742 A | | 3/1942 | Crawford | 135/120 |
| 3,000,433 A | * | 9/1961 | Kemper | 138/147 |
| 3,192,542 A | | 7/1965 | Mills | 9/1 |
| 3,628,572 A | * | 12/1971 | Shannon | 138/149 |
| 3,634,925 A | | 1/1972 | Van Loo | 29/458 |
| 3,973,720 A | | 8/1976 | Schmid | 206/586 |
| 3,985,483 A | | 10/1976 | Clay | 425/112 |
| 4,143,653 A | | 3/1979 | Wichman | 602/22 |
| 4,271,218 A | * | 6/1981 | Heckel et al. | 138/141 |
| 4,940,009 A | | 7/1990 | Keithley | 114/343 |
| 5,054,513 A | * | 10/1991 | Trueb et al. | 137/247.51 |
| 5,427,849 A | * | 6/1995 | McClintock et al. | 138/128 |
| 5,479,872 A | | 1/1996 | Hulett | 114/361 |
| 5,829,832 A | * | 11/1998 | Molee et al. | 24/560 |
| 5,904,406 A | * | 5/1999 | Stewart | 297/220 |

* cited by examiner

*Primary Examiner*—Kenneth R. Rice
(74) *Attorney, Agent, or Firm*—J. Nevin Shaffer, Jr.

(57) ABSTRACT

An assembly, composed of long foamed tubing, with a soft inner surface and a smooth outer surface, so configured that it covers and minimizes the problem of snare points on equipment in contact with a protective covering tarpaulin. Protective tarpaulin are generally made of fabric or synthetic sheets. They can be made waterproof by impregnating them with various water proofing agents as well as being coated with a variety of natural or synthetic coatings such as acrylic or synthetic rubberized latices. Synthetic tarpaulins can be reinforced with a fiber matrics, if needed and used for example to cover pleasure boats, construction equipment, flatbed trucks, construction sites, airplanes, cars and trucks, where one wishes to protect from environmental exposure. Yet in spite of these intentions, these sheets exhibit significant defects in that they can be readily ripped and torn on the sharp and protruding edges of the equipment that they are intended to protect. The equipment is damaged by the rubbing of the tarpaulin. This inventions resolves this problem.

3 Claims, 6 Drawing Sheets

ASSEMBLY AND METHOD TO IMPROVE TARPAULIN FUNCTION AS A PROTECTIVE COVER

TECHNICAL FIELD

This invention relates an assembly utilized with tarpaulin coverings, for large articles such as, boats, automobiles, motorcycles, trailers, tents and the like. This is particularly applicable when such covered articles are stored outside in exposure to the elements, such as sun, wind, snow or rain and where protection of the equipment is desired.

BACKGROUND

Flexible sheets of water repellant material, commonly called tarpaulins, have been used for centuries to protect surfaces which are prone to weathering. A common use is to cover a boat which is not in use. Sometimes the boat will be covered for an entire season, such as the winter. Tarpaulins are also used to protect many other small vehicles, including automobiles, motorcycles, snowmobiles, lawn tractors, and so on. Sometimes tarpaulins are used in lieu of walls, such as for the walls of a flatbed truck or railroad car, or even a tent or small garage.

Tarpaulins are generally made of natural or synthetics fibers and can be rubberized, containing treated or untreated fibers and can be made waterproof by impregnating them with various water proofing agents such as silicones, as well as variety of natural or synthetic coatings. Typical of such coatings are acrylic or synthetic rubberized latices, vinyl or vinylidene polymers and copolymers. Tarpaulin materials are available with natural or synthetic fiber reinforcement fibers imbedded as a matrics within the Tarpaulin continuous phase, as a fiber reinforcing materials.

One problem with tarpaulins is that they may shrink from the effects of rain, wind and drying sun and therefore rip or tear at certain points of stress. In addition to weakness at stress points due to shrinkage, the effects of wind, water, weight, or snow weight may also cause tearing at stress points. Gentle but continuous movement caused by even light winds may wear away the surface of the tarpaulin at stress points, eventually causing tearing and ripping. This problem can be exacerbated by even slight irregularities in the ride or rub points, like metal or wooden seams, slight angles, or other small surface irregularities, including required devices like windshield wiper posts, and irregularities which might easily occur after manufacturing, such as nicks in the supporting framework, which cause slivers, or trap small pockets of moisture which freeze, creating small bumps which literally wear and tear the fabric of the tarpaulin.

A second problem with tarpaulins in that they can also cause wear to the object that they are supposed to protect, at the points where they "ride" or rub. (Tarpaulins usually rest on appropriate supporting frame structure of the device being protected.) Since the rub point may be a chromed metal tube or a well varnished piece of mahogany or other expensive wood, this can be a very undesirable side effect. (The natural "rides" or rub points will vary from boat to boat or vehicle to vehicle. On a boat, the natural ride points could be thought as the top of the windshield and various pieces of metal fittings, usually tubing, which stand clear of the deck both fore and aft, such as the bow rail and the stern rail or stern cleats.)

A third problem with tarpaulins is that they when they are allowed to follow the natural contours of the extant ride or rub points of the object being protected, they can create a rather shallow angle of coverage which is sometimes insufficient to allow snow slippage or water drainage.

A fourth problem with tarpaulins is that they sometimes can not be tightened (or made taut) as tightly as possible because:

1) to do so could cause undue stress to the natural ride, or rub points.
2) the tarpaulin is slightly oversized due to stretching or to a "one size fits all" approach to manufacturing of the tarpaulin. (Inexact tailoring being cheaper to produce and purchase than specific tailoring.)

A fifth problem with tarpaulins is that they contain many metal fittings, such as metal grommets. These metal fittings may scratch the rub or ride points for a couple of reasons:
1) Unless a tarpaulin is exactly tailored to a specific boat or vehicle, these metal fittings may (by the chance of a poor fit) come in contact with ride or rub points after the tarpaulin is attached.
2) When the tarpaulin is used frequently, such as covering a boat on a daily basis, there is a very good chance that these metal fittings may slide across rub points when the tarpaulin is being attached or removed.

The present invention provides a assembly and a method of solving the problems outlined above. However before reviewing the details of the present invention, several related prior art patents were searched and will now be listed and briefly mentioned. The Applicant notes that they have reviewed the related art and do not find them to be relevant to the present invention.

Hulett U.S. Pat. No. 5,479,872 is patent for an anti-sagging "Support for boatcover" device. It addresses the tarpaulin sagging problem, which is vastly improved by the method of the present invention; however in a completely different way.

Devices for protective padding for covers or tarpaulins, particularly covers of fabric, appear to be nonexistent. A patent issued to William R. Van Loo. U.S. Pat. No. 3,634,925, granted on, Jan. 18, 1972, shows a method of assembling a padded arm rest. In this patent, a channel member is placed in a mold and covered with plastic foam such as polyurethane, vinyl or other suitable material. Metal flanges of the channel are bent to secure the padded arm rest permanently to the chair structure.

Additional patents considered are U.S. Pat. Nos. 2,277,742 to Crawford., Mills U.S. Pat. No. 3,192,542, Schmid II, U.S. Pat. No. 3,973,720, and Wichman. U.S. Pat. No. 4,143,653. However, none of these patented devices solve the problems described above and solved by the present invention.

The device of Crawford U.S. Pat. No. 2,277,742 for protecting canvas tents shows an elongated length of fabric which is adapted to overlie the top edge of a rafter which has attaching clips secured thereto and depending from the bottom face thereof, the clips having terminal portions configured to engage the bottom side edges of the rafter.

The Mills. U.S. Pat. No. 3,192,542 device is for a fabric cover for boats, which essentially comprises a flexible cover for the boat together with bending resilient fastener members secured to the body portion of the cover member at intervals along its edge and having portions thereof which extend across the outer surface of the boat's gunwale guard and resiliently contact the underside of the guard.

The Schmid patent U.S. Pat. No. 3,973,720 is a protective cushioning pad having foldable sections for protecting the edges and corners of articles being packaged. The specific structure and arrangement of this device is substantially different from that of the present invention.

The Wichman patent U.S. Pat. No. 4,143,653 shows a device for splintering broken extremities and comprises a flexible strip having individual perpendicular projections along one edge together with a cushioning element. Again, this structure is entirely different from that of the present invention.

The Keithley patent U.S. Pat. No. 4.940.009 intends to provide the same function as the present invention is related to the present invention. However, the techniques is quite different. Some of the differences are: Keithley describes a series of small pads. The present invention can represent one contiguous cylinder. (Keithley describes a string of protective pads, but contiguous protection is impossible because of the shape of the Keithley pad.) A Keithley pad is in the shape of a (top view) oval cough drop with arms; a front view looks hemispherical with arms. The assembly of the present invention looks like a piece of thick foam tubing with about 20% cut out longitudinally as a very deep groove.

A Keithley pad is held in place by flexible arms, and in other embodiments the arms are supplemented by double-sided tape, adhesives, Velcro, magnets, or a semi-arcuate groove equal in depth to ½ the diameter of the tubing it rests on. The assembly of the present invention envelopes three sides of. the edge or three fourths of the surface area of the tubing it is protecting, and is held in place by friction. The friction is enhanced by the inner surface treatment of the assembly of the present invention, and by its contiguous nature—it is harder to push a 4 foot object along a tube than is to push a 4 inch object.

Keithley claims a specific manufacturing technique as part of his patent. Clay. et al. U.S. Pat. No. 3,985,483, is for producing insulating foam tubes for pipes. The Assembly of the present invention is much less complex than the Keithley pad. It requires no bendable arms, Velcro, adhesive pads or other adhesives. In fact, although it expands and compresses, it really has no moving parts to break. No manufacturing variations are necessary to install the present assembly on odd shapes like boat cleats or odd angles, simply because the assembly of the present invention can be cut to length with a utility knife at any angle desired. Larger protrusions, like windshield wiper posts or tips can be accommodated by slightly hollowing out specific areas.

The present assembly permits less tarpaulin sagging than the Keithley pad because the many small pads equate to many bumps which allow sagging between them, while the contiguous nature of the Assembly of the present invention does not. The Assembly of the present invention also provides an alternative to anti-sagging devices like those in Hulett U.S. Pat. No. 5,479,872. The Assembly of the present invention always reduces sagging for stretched or oversized tarpaulins because it increases the diameter of the attachment points, thereby increasing total area to be covered by the tarpaulin.

SUMMARY OF INVENTION

The present invention, as noted above, represents an, assembly, a system and a method of protecting, boats, airplanes, trucks and equipment of all types,as well as roofs on buildings, garden equipment and recreational equipment, outdoor signs and all other constructions that employs or require tarpaulin coverings, for environmental protection This protection, of both the protuberant surface to be protected and that of the surface of the tarpaulin itself. This protection is afforded by means of flexible protective assembly formed with a base member of bendable material in the shape of a long tube, with a soft, crushable inner surface, and a thin stiff smooth outer surface, is used as a "buffer" between the surface of such as a ship, boat, airplane or truck fittings (which are usually aluminum or light metal tubes) and tarpaulins.

The foam tube, or cylinder of the assembly, has a cutout forming a deep groove along one longitudinal side. The assembly is attached to the substrate to be protected, by forcing the deep groove in the tube on one side of the assembly, over the edge of the metal protuberant surface of the substrate to be protected. The foam tube can be any length which can be manufactured by current foam pipe extrusion techniques. The foam tube assembly can be held in place by friction, which is enhanced by the amount of foam tubing which actually comes in contact with the protected surface and by the natural or manufactured crushability feature of the interior surface. The contiguous length of the tubing also contributes to the friction fit.

Further modifications to keep the assembly in place include the use of an O ring clamp that fits over the edge or tube being protected and under the tubular tarpaulin cushioning tube, and an O-ring clamp that fits over the protective tube itself. Hook and ring techniques such as VELCRO™ and pressure sensitive tape; can also be used to keep the assembly in place over the protuberant and the surface of the substrate being protected. Those experienced in the art will realize that the surface of any clamp, hook and ring, or tape technique must present a very smooth surface or be recessed in the exterior surface of the protective foam tube to prevent the creation of new wear points for the tarpaulin.

BRIEF DESCRIPTION OF THE DRAWINGS

FIG. 5 This is composed of two separate FIGS., 5A and 5B.

DETAILED DESCRIPTION OF THE INVENTION

Figure 1:
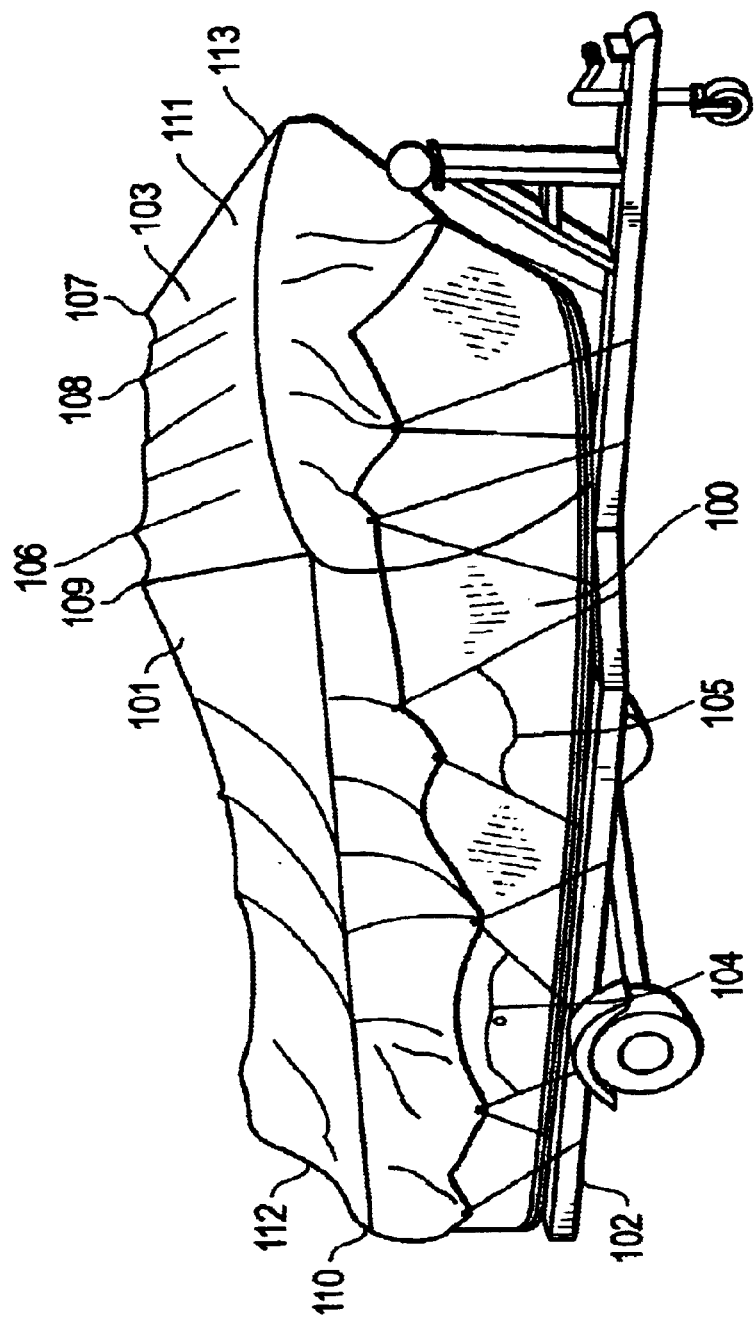
FIG. 1 is a prior art perspective view of a small craft protected by a storage cover.

The specific details of the present invention regarding both apparatus, method to improve tarpaulin function as a protective cover for substrates, are described.

The solution to the numerous problems outlined in the Background Section, is to provide an assembly which protects the ride or rub points of the object being protected, and also protects the surface of the tarpaulin. The assembly is created by molding a slightly open tube, with a cross section roughly three quarters of a circle, in the approximate shape of a horseshoe, or the Greek letter Omega. The assembly looks like a thick tube, or cylinder, with a very deep groove running longitudinally along one side. These tubes are attached to the object being protected primarily by means of a friction fit to the appropriate supporting frame structure of the device being protected. The "groove" side is simply forced over the supporting frame structure. For example, when protecting a small boat, these tubes would be pushed onto the top of the windshield and to other places where the tarpaulin finds it ride points. If necessary, the friction fit can be supplemented by an O-ring clamp which is slightly larger than the inside diameter of the protective tube and is used as a bumper attached to the frame, and also by an O-ring clamp which is slightly larger than the outside diameter of the protective tube and is used as a traditional clamp. While referred to as a protective foam tube, actually a protective tube could be made of any semi-rigid mass of cushion material such as urethane foam, sheet foam, resin material having open or closed cells, hard rubber, synthetic rubber, or any other type material which is semi-resilient and yet rather firm and hard. The resultant tube has the qualities of being made of material which is bendable but has a shaped form retention characteristic; and has a rather soft and somewhat crushable inner surface and a smoother, harder outer surface. Many foam structures will naturally provide a crushable inner surface, as can be readily seen by carving out a cross section of a child's foam baseball bat; however, when naturally harder materials are used, the crushable inner surface can be created by creating serpentine grooves or cross hatching as part of a post-manufacturing process. When applied to a framing member, either a section of tubing or an edge of roughly the same width as tubing, the inner surface of the protective foam tubing conforms to the irregularities of the framing member and thus protects the tarpaulin from the abrasive action of the frame, and since the tarpaulin now rides or rubs the smooth outer surface of the protective tube, the framing member is also protected from the abrasive action of the tarpaulin. Thus the assembly of the present invention protects both the tarpaulin and the fitting from abrasion. In some installations, a wider outside diameter of protective foam tubing can be used to create a steeper angle in the draping of the tarpaulin, either by using no foam tubing on lower ride points or a piece of protective foam tubing with a smaller outside diameter on the lower ride points. The assembly of the present invention also distributes stress loads better because the diameter of the protective tube is obviously larger than the edge or tube it is attached, and also, the foam gives a little, so you can tighten the tarpaulin more. Finally, since the protective foam tubing is applied before the tarpaulin is attached, and is of course in place when the tarpaulin is removed, the ride and rub points are protected from accidental scratching by the metal fittings of the tarpaulin.

It should be emphasized that the purpose of the protective tubes of the present invention is for providing adaptability of the devices to many areas of a boat, and/or other units such as automobiles or trucks, which needs to be covered and protected by a tarpaulin or the like. Tarpaulins and other specifically configured covers for boats, trailers, etc. are very expensive. Even the most common sizes and relatively small tarpaulins today are expensive. Thus, it is highly desirable for anyone using such covers to protect same against ripping or tearing in use. The areas protected by tarpaulins are also very expensive, and it is important to protect the adaptive framing areas of these areas from scratching, tarnishing, and wear. By using the protective tubes of the present invention, this can be easily achieved.

A major embodiment of the present invention, is to provide a simply constructed, shape adaptable, flexible protective tube which pads, covers overlying large articles such as boats, automobiles, trailers, trucks, or the like.

Another embodiment of the present invention is to provide an easily installed, semi-permanent, flexible protective tube which can be fabricated in quantity and in a cost-effective manner.

A further embodiment of this invention is to provide a flexible protective tube which is simple to install, equally simple to remove, but can be secured in place to resist migration away from stress points.

Another further embodiment is to provide a flexible protective tube which can be angularly adjusted as well as shaped or tailored by an average person with a utility knife to conform to any compound corner configuration.

Yet another further embodiment of the present invention is to provide a protective tube device which can be easily manufactured in a large number of inner diameters, outer diameters, and lengths.

A still further embodiment of the present invention is to provide a protective tube which can be tailored by an unskilled installer to conform to the many variations presented in existing frameworks of boats and other vehicles to permit very specific components to be properly and adequately covered for protection of an external tarp or dust cover.

A still further embodiment of the present invention is to provide a flexible protective tube which can be strategically located on or adjacent to irregularly shaped structures which put a stress upon tightly stretched covers and can cause damage such as ripping and tearing of such covers.

Still yet another important embodiment of the present invention is to provide a flexible protective tube which will present soft, rounded contours to fabric covers, or tarpaulins, or dust covers, which may shrink from the effects of rain, wind and drying sun and therefore rip or tear at certain points of stress.

A further embodiment of the present invention is to provide a continuous length of protective tube structures which are may consist of one contiguous unit or of multiple adjacent protective tube structures installed side-by-side for use as a combined unit.

The present invention offers many very important and desirable advantages and benefits over the prior art. Protective tube devices of the present invention can be manufactured in nearly any length and any reasonable inside and outside diameter. The tubes can be cut to any size and to conform to any inside or outside angle. Since the primary form of attachment is a friction fit via a deep groove, the attachment method is much simpler than any prior art. Preferably, each protective tube is composed of a semi-rigid mass of cushion material such as urethane foam, sheet foam, resin material having open or closed cells, hard rubber, synthetic rubber, or any other type material which is semi-resilient and yet rather firm and hard, and can be manufactured with a relative hard smooth outer surface and a crushable softer inner surface. For example, when applying one of the elongated protective pads to a boat cleat, the embodiment of this invention having a crushable inner surface and very simple site modifications with a utility knife allows a very well fitted attachment of the overall device to the boat cleat.

These together with other embodiments and advantages which will become subsequently apparent reside in the details of construction and operation as more fully hereinafter described and claimed, reference being had to the accompanying drawings forming a part hereof, wherein like numerals refer to like parts throughout.

PREFERRED EMBODIMENTS

The preferred embodiments of the present invention are described in detail by use of the following figures.

FIG. 1 In this prior art perspective view, there is shown a small craft at 100, cradled upon a trailer at 102 snugly shrouded by a cover at 101 which is securely fastened in place by ropes or lines at 104 and at 105 in accordance with present practice. Multiple stress points at 106, 107, 108, 109 and 110 are indicated, particularly with respect to the windshield at 111, stern cleat 112 and bow rail at 113, all of which are potential damage areas to cover at 101. This is best demonstrated in FIG. 2.

Figure 2:
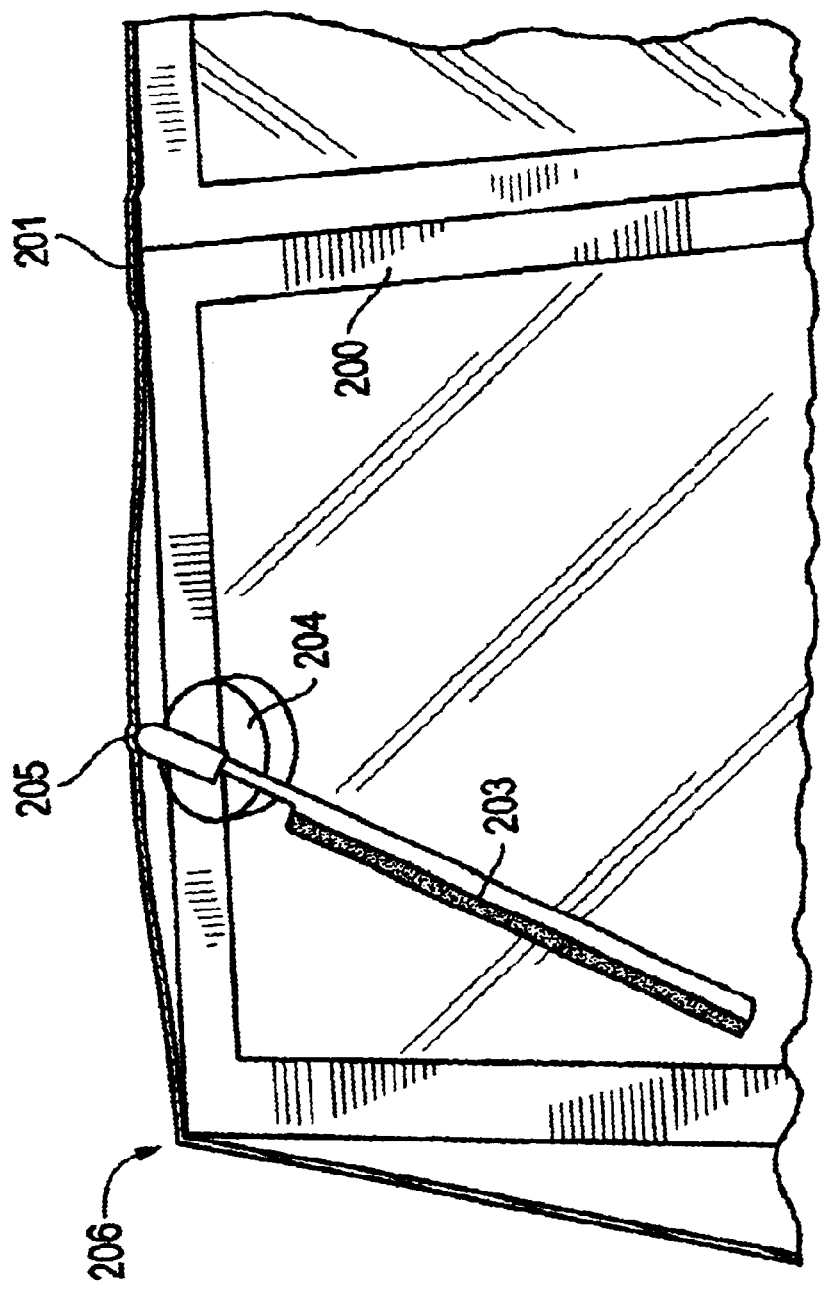
FIG. 2 is a fragmentary sectional view showing a front view of the small craft windshield joint of FIG. 1.

FIG. 2 is a fragmentary sectional view showing a front view of a boat windshield joint at 200, having at the top edge thereof a stress point at 201 and a windshield blade at 203 connected to wiper motor at 204 having another stress point at 205 at the top connection thereof, and, of course, at the edge of the windshield, another very pronounced stress point is present at 206.

Figure 3A:
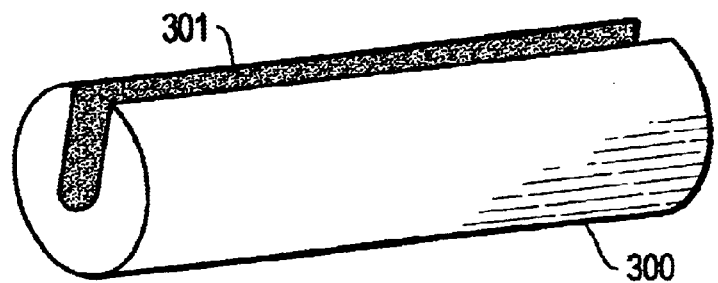
FIG. 3. This figure is composed of three sub FIGS. 3A, 3B, and 3C. They are intended to offer the viewer a prospective from various angles of one form of the assembly of the present invention.
Figure 3B:
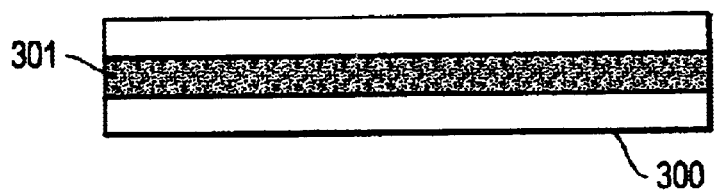
Figure 3C:
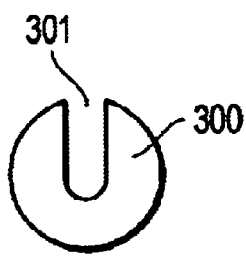

FIG. 3 This figure is composed of three sub FIGS. 3A, 3B, and 3C. They are intended to offer the viewer a prospective from various angles of one form of the present invention. FIG. 3A is a plan view of a form of the invention comprising a thick foam tube at location 300, with an excised longitudinal deep groove at location 301, running along the length of the thick foam tube at 300. FIG. 3B represents a top view of FIG. 3A again showing the thick foam tube at 300, the groove at 301, running the length of the thick foam tube 300. FIG. 3C represents an cross sectional end view of the thick foam tube and the longitudinal groove 301 running down the length of the foam tube.

Figure 4:
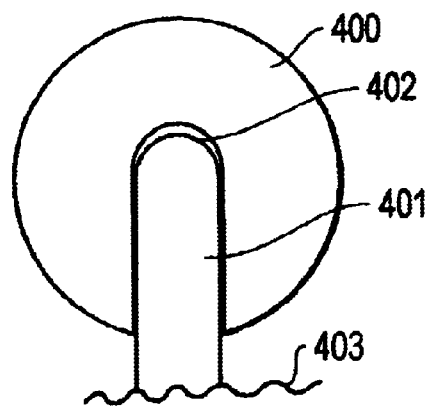
FIG. 4 This demonstrates a typical application of the present invention. This figure represents a transverse cross-sectional view of an installed protective foam tube assembly.

FIG. 4 This demonstrates a typical application of the present invention. This figure represents a transverse cross-sectional view of an installed protective foam tube at 400 of the present invention containing the longitudinal groove at 402 and illustrates the foam tube 400 securely forced in place, along a top portion of a boats windshield at 401. The windshield is attached to the frame at 403. The outer surface of the foamed tube at 404, is smooth.

FIG. 5 This is composed of two separate FIGS., 5A and 5B.

Figures 5A, 5B:
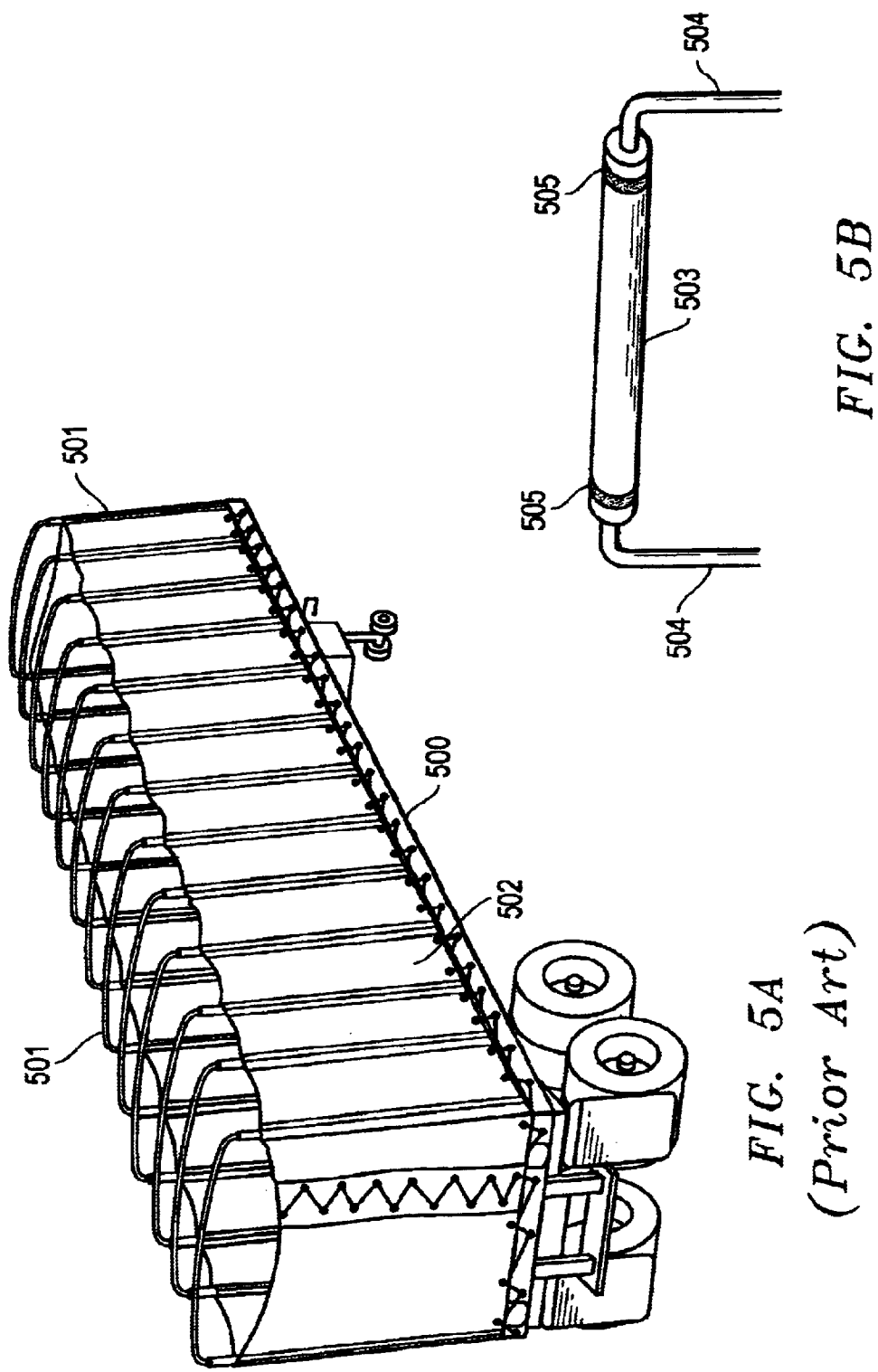
FIG. 5A This a prior art view of a flatbed truck with an added superstructure at, added to support a tarpaulin FIG. 5B This drawing of the current invention, is a fragmentary prospective view a single truck support member on the flatbed truck, showing the assembly of the present invention, intended to support a tarpaulin.

FIG. 5A This a prior art view of a flatbed truck at 500, with an added superstructure at 501, added to support intended to support a tarpaulin at 502.

FIG. 5B This drawing of the current invention, is fragmentary prospective view a single support member at 501 of an installed for the flatbed truck showing the foam tube of the present invention at 503 mounted and attached to a single upper rail at 504 and held in place by "O rings" at 505.

Figure 6A:
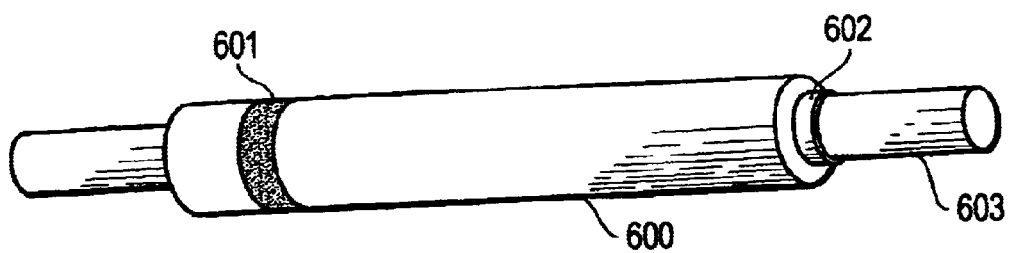
FIG. 6A This is drawing of the present invention and represents a fragmentary prospective view of a piece of tubing for a typical tarpaulin support showing the protective foam tubing, FIG. 6B This represents a cross-section of a piece of tubing-for a typical tarpaulin support.
Figure 6B:
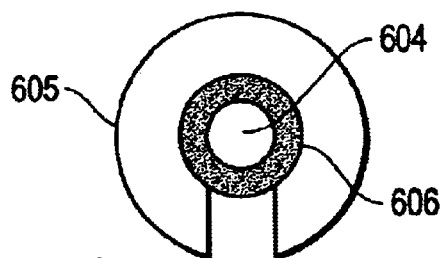

FIG. 6A This drawing of the present invention represents a fragmentary prospective view of a piece of tubing at 603, for a typical tarpaulin support showing the protective foam tubing at 600, mounted and secured by one external "O ring" clamp at 601, and by one "O ring" clamp at 602 which is clamped to the tubing, to serve as a bumper FIG. 6B This represents a cross-section of a piece of tubing-604 for a typical tarpaulin support showing the protective foam tube at 605, mounted and secured by one "O-ring" at 606 which is clamped to the tubing 604 and serves as a bumper.

Figure 7:
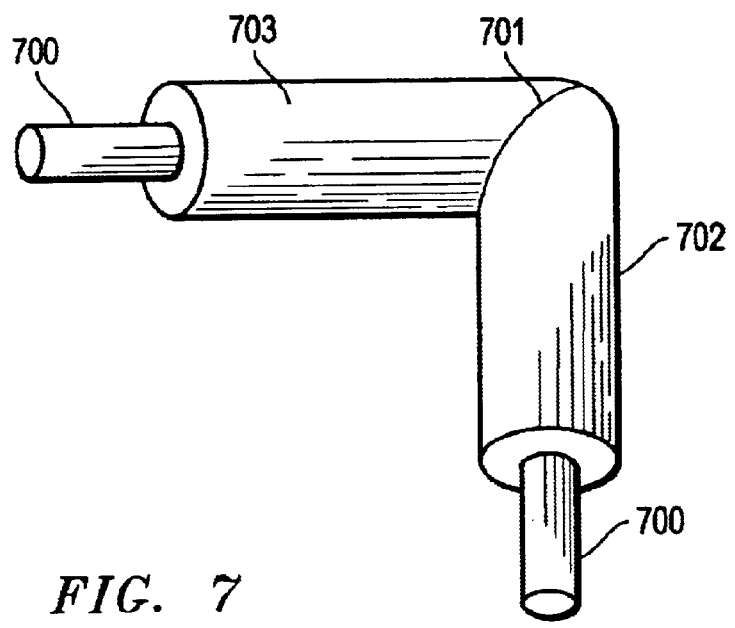
FIG. 7 This fragmentary perspective view is of the assembly tubing meeting at right angles with another section of tubing.

FIG. 7 This fragmentary perspective view is of a tubing at 700, meeting at right angles at 701, with the protective foam tubes 702 and 703, mounted by the simple method of cutting an appropriate angle with a simple utility knife or the like.

Figure 8A:
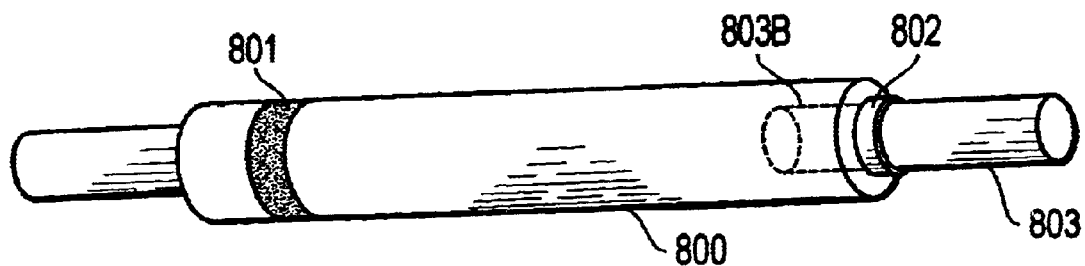
FIG. 8A This represents a cross-section of a piece of tubing-for a typical tarpaulin support, similar to FIG. 6A & 6B. However this figure shows a recessed area in the molded assembly to accommodate a clamp or "O" ring such that the assembly's surface does not exhibit a high spot where the clamp or ring is employed.

FIG. 8A This represents a cross-section of a piece of tubing-for a typical tarpaulin support, similar to FIG. 6A & 6B. However this figure shows a recessed area at 801 in the molded assembly, to accommodate a clamp or "O" ring, such that the assembly's surface does not exhibit a high spot where the clamp or ring is employed. Similarly the dotted line 804 depicts a molded recess in the assembly 800, to accommodate a clamp. Position 803A represents a fragmentary prospective view of a piece of tubing and 803B depicts the grove recess molded into the Assembly to accommodate a clamp or "O" ring. Position 802 represents a clamp.

Figure 8B:
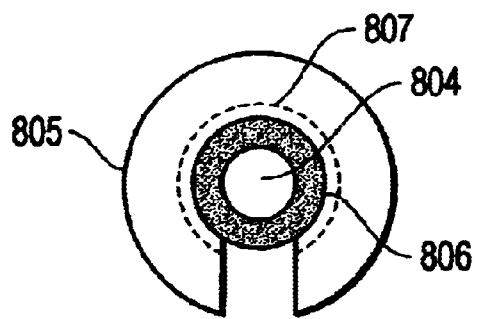
FIG. 8B. This represents a cross-section of a piece of tubing for a typical tarpaulin support. However this figure shows a recessed area depicted as a dotted line in the molded assembly to accommodate a clamp or "O" ring.

FIG. 8B. This represents a cross-section of a piece of tubing for a typical tarpaulin support. However this figure shows a recessed area 807 depicted as a dotted line in the molded assembly, to accommodate a clamp or "O" ring bumper. A piece of tubing shown at 804 for a typical tarpaulin support showing the protective foam tube at 805, mounted and secured by one "O-ring" at 806 which is clamped to the tubing 604 and serves as a bumper.

Resin materials and/or foam materials which may be used for the padding material of the Assembly of present invention are as follows:

(1) Synthetic resin foams of thermoplastic or thermoset, open or closed cells material. These foams can be self-foaming, such as polyurethane or polystyrene resin, or they may be synthetic resins which contain a foaming agent such as carbonates or peroxides.

(2) There also can be used natural resins, such as rubber latex, which can be foamed by foaming agents. The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An assembly for protecting irregular surfaces of substrates, the assembly comprising:
   a) a base member composed of bendable flexible material exhibiting shape retention characteristics, with a crushable interior surface and a smooth stiff outer surface; and
   b) said flexible material in the shape of a tube with a U-shaped groove with two sides connected to a curved bottom with a radius, wherein said two sides of said U-shaped groove are conformed to create two parallel surfaces spaced apart by said radius of said curved bottom.

2. The apparatus of claim 1 further comprising o-ring stops on both ends of a section of said base member.

3. The apparatus of claim 1 further comprising at least one recess in said interior surface conformed to receive and retain an o-ring.

* * * * *